US009220092B2

(12) United States Patent
Choi et al.

(10) Patent No.: US 9,220,092 B2
(45) Date of Patent: Dec. 22, 2015

(54) METHOD AND APPARATUS FOR TRANSMITTING CONTROL SIGNAL

(71) Applicant: Samsung Electronics Co., Ltd., Gyeonggi-do (KR)

(72) Inventors: Seunghoon Choi, Gyeonggi-do (KR); Joonyoung Cho, Gyeonggi-do (KR); Hyoungju Ji, Seoul (KR); Youngbum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 13/668,887

(22) Filed: Nov. 5, 2012

(65) Prior Publication Data
US 2013/0114532 A1   May 9, 2013

(30) Foreign Application Priority Data
Nov. 4, 2011   (KR) .................. 10-2011-0114672

(51) Int. Cl.
*H04L 5/00*   (2006.01)
*H04W 72/04*   (2009.01)

(52) U.S. Cl.
CPC ........... *H04W 72/042* (2013.01); *H04L 5/0044* (2013.01); *H04L 5/0053* (2013.01); *H04L 5/0091* (2013.01); *H04L 5/001* (2013.01)

(58) Field of Classification Search
CPC . H04W 72/042; H04W 72/04; H04W 74/006; H04W 74/002; H04W 72/1263; H04W 72/1278; H04W 72/1289; H04L 5/0053; H04L 5/001; H04L 5/0007; H04L 5/0094; H04L 5/0037; H04L 5/0092; H04L 5/00; H04L 5/0044; H04L 5/0091
USPC ......... 370/312, 328, 329, 330, 252, 341, 332, 370/280; 455/509, 452.1, 450, 451
See application file for complete search history.

(56) References Cited

U.S. PATENT DOCUMENTS

2008/0207135 A1\*   8/2008   Varadarajan et al. ........... 455/69
2009/0003274 A1\*   1/2009   Kwak et al. .................... 370/329
(Continued)

FOREIGN PATENT DOCUMENTS

EP           2 557 879        2/2013
WO     WO 2011/084026         7/2011
(Continued)

OTHER PUBLICATIONS

3GPP TS 36.213 V10.3.0 (Technical Specification), 3rd Generation Partnership Project; Technical Specification Group Radio Access Network; Evolved Universal Terrestrial Radio Access (E-UTRA); Physical Layer Prodcedures (Release 10), (Sep. 2011), 122 Pages.*

(Continued)

*Primary Examiner* — Edan Orgad
*Assistant Examiner* — Ivan O Latorre
(74) *Attorney, Agent, or Firm* — The Farrell Law Firm, P.C.

(57) ABSTRACT

Methods and apparatus are provided for transmitting and receiving a control signal. Indices of Resource Block (RB) sets are transmitted through higher layer signaling. Downlink Control Information (DCI) generated in a short DCI format is transmitted from a Base Station (BS) to a terminal. The DCI includes a first index indicating an RB set having at least one allocated RB and a second index indicating the at least one allocated RB. The terminal determines whether short DCI format is configured to be used. When the short DCI format is configured to be used, the first index and second index are received. The terminal communicates through the at least one allocated RB identified by the first and second indices.

12 Claims, 14 Drawing Sheets

(56) References Cited

U.S. PATENT DOCUMENTS

| | | | |
|---|---|---|---|
| 2009/0154588 A1* | 6/2009 | Chen et al. | 375/267 |
| 2010/0232373 A1* | 9/2010 | Nory et al. | 370/329 |
| 2011/0070845 A1 | 3/2011 | Chen et al. | |
| 2011/0170496 A1* | 7/2011 | Fong et al. | 370/329 |
| 2011/0237283 A1* | 9/2011 | Shan et al. | 455/509 |
| 2011/0255485 A1* | 10/2011 | Chen et al. | 370/329 |
| 2011/0317652 A1* | 12/2011 | Kim et al. | 370/329 |
| 2012/0044922 A1* | 2/2012 | Ishii | 370/338 |
| 2012/0275413 A1* | 11/2012 | Hong et al. | 370/329 |
| 2012/0287848 A1* | 11/2012 | Kim et al. | 370/315 |
| 2012/0307757 A1* | 12/2012 | Edler Von Elbwart et al. | 370/329 |
| 2013/0010685 A1* | 1/2013 | Kim et al. | 370/315 |
| 2013/0058295 A1* | 3/2013 | Ko et al. | 370/329 |
| 2013/0070703 A1 | 3/2013 | Yasukawa et al. | |
| 2013/0128828 A1* | 5/2013 | Baldemair et al. | 370/329 |
| 2013/0315188 A1* | 11/2013 | Pajukoski et al. | 370/329 |

FOREIGN PATENT DOCUMENTS

| | | | | |
|---|---|---|---|---|
| WO | WO 2011/090688 | | 7/2011 | |
| WO | WO 2011084026 | * | 7/2011 | H04J 11/00 |
| WO | WO 2011/093644 | | 8/2011 | |
| WO | WO 2011/103483 | | 8/2011 | |
| WO | WO 2011/116365 | | 9/2011 | |
| WO | WO 2011/125700 | | 10/2011 | |

OTHER PUBLICATIONS

NEC Group, "Bitmap Convention for Resource Allocation", R1-082363, 3GPP TSG-RAN1 Meeting #53bis, Jun. 30-Jul. 4, 2008, 8 pages.

European Search Report dated Jul. 15, 2015 issued in counterpart application No. 12844895.8-1851, 6 pages.

* cited by examiner

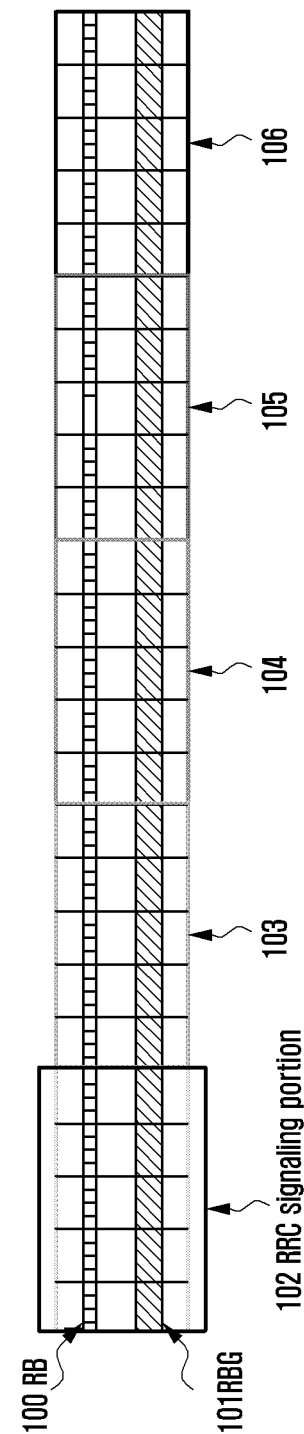

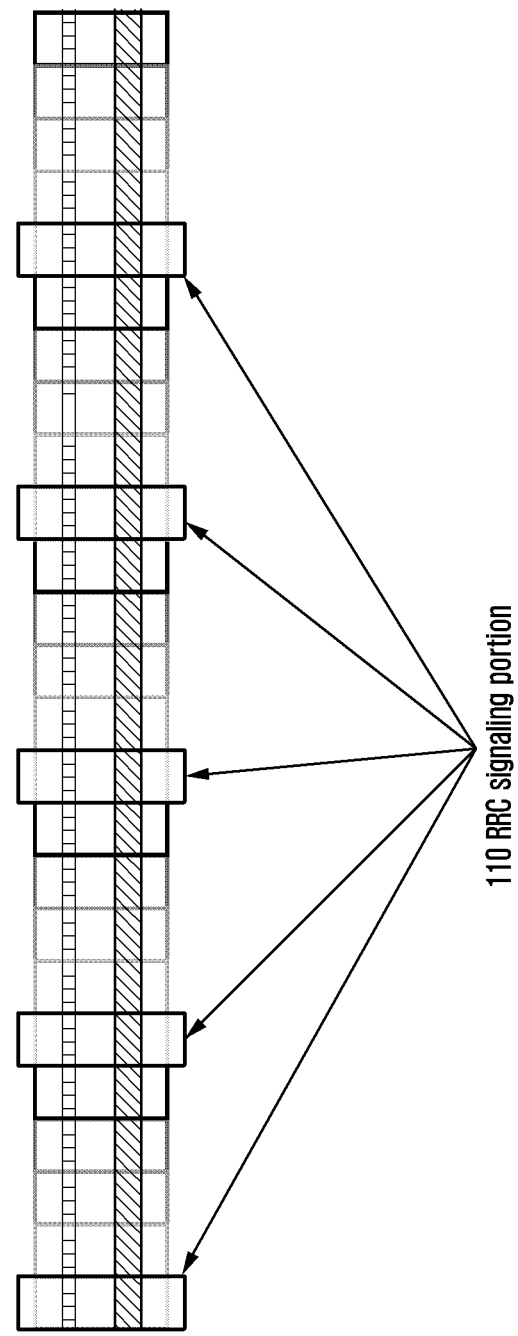

FIG. 2

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |

METHOD AND APPARATUS FOR TRANSMITTING CONTROL SIGNAL

PRIORITY

This application claims priority under 35 U.S.C. 119(a) to an application filed in the Korean Intellectual Property Office on Nov. 4, 2011, and assigned Serial No. 10-2011-0114672, the contents of which are incorporated herein by reference.

BACKGROUND OF THE INVENTION

1. Field of the Invention

The present invention relates generally to a communication system, and more particularly, to a method and apparatus for transmitting a control signal.

2. Description of the Related Art

The $3^{rd}$ Generation Partnership Project (3GPP) Long Term Evolution (LTE) Release-10 (Rel-10) has adopted a bandwidth extension technique to support a data rate that is higher than that of the LTE Rel-8. The bandwidth extension technique is also referred to as Carrier Aggregation (CA). With CA, it is possible to increase the data rate in proportion to the extended bandwidth, as compared to the single carrier data transmission of an LTE Rel-8 terminal (also referred to herein as User Equipment (UE)).

In CA, each band is referred to as a Component Carrier (CC). The LTE rel-8 UE is configured to operate with one uplink and one downlink CC. One downlink CC and one uplink CC, which are linked with each other in association with a System Information Block 2 (SIB-2), is referred to as cell. The information about the SIB-2 association relationship between the uplink and downlink CCs is transmitted in a UE-specific signal. The UE that supports CA is capable of receiving downlink data and transmitting uplink data through multiple serving cells. In Rel-10, when it is difficult to transmit Physical Downlink Control Channel (PDCCH) to a specific UE through a specific serving cell, the base station (also referred to herein as an evolved Node B (eNB)) is capable of transmitting PDCCH through another serving cell with the configuration of Carrier Indication Field (CIF). The CIF informs that the PDCCH indicates Physical Downlink Shared Channel (PDSCH) or Physical Uplink Shared Channel (PUSCH) of another serving cell. The CIF can be configured to the UE capable of CA. The CIF is designed such that a specific serving cell is capable of indicating another serving cell, with 3 extra bits added to the PDCCH information. The CIF is transmitted only when cross carrier scheduling is applied, and thus, if no CIF is transmitted, the cross carrier scheduling is not applied. If it is included in a downlink (DL) assignment, the CIF indicates the serving cell through which the PDSCH scheduled in the DL assignment is to be transmitted. If it is included in an uplink (UL) grant, the CIF indicates the serving cell through which the PUSCH scheduled in the UL grant is to be transmitted. When the cross carrier scheduling is supported, a specific serving cell has to transmit PDCCH for scheduling data in other serving cells. Accordingly, the specific serving cell needs large amounts of resources for PDCCH transmission.

The LTE Rel-10 standard specifies 13 Downlink Control Information (DCI) formats 0, 1, 1A, 1B, 1C, 1D, 2, 2A, 2B, 2C, 3, 3A, and 4. Among them, DCI formats 0 and 4 are the formats for a UL grant addressed to a UE. The DCI formats 3 and 3A are used for Transmit Power Control (TPC) command transmission for Physical Uplink Control Channel (PUCCH) and Physical Uplink Shared Channel (PUSCH). The rest of the DCI formats are used for DL allocation. Particularly, the DCI format 1A is the format for supporting compact downlink scheduling and used for fall back in the case of missing other downlink DCI format. The DCI format 0 and 1A are configured as the same size, and 1 bit of the DCI formats 0 and 1A are used as a flag to discriminate between the DCI formats 0 and 1A.

According to Rel-10, when performing blind decoding, the UE assumes the DCI has one of three sizes. The UE first attempts blind decoding based on the assumption that the size of the received DCI matches the size of DCI formats 0 and 1A (referred to herein as a first size). Next, the UE attempts blind decoding based on the assumption that the size of the received DCI matches the size of another DCI format, with the exception of formats 0 and 1A, according to the transmission mode (referred to herein as a second size). When the specific serving cell supports uplink Single User Multiple Input Multiple Output (UL SU-MIMO), the UE further attempts blind decoding based on the assumption that the size of the received DCI matches the size of the DCI format 4 (referred to herein as a third size).

Table 1 shows the sizes of the DCIs for blind decoding of the UE capable of CA.

TABLE 1

| Search Space | DL Tx mode | First size format | Second size format | Third size format |
|---|---|---|---|---|
| Common Search Space | 1 to 7 | 1A/0 | 1C | — |
| UE-specific Search Space | 1, 2, 7 | 1A/0 | 1 | 4 |
| | 3 | 1A/0 | 2A | 4 |
| | 4 | 1A/0 | 2 | 4 |
| | 5 | 1A/0 | 1D | 4 |
| | 6 | 1A/0 | 1B | 4 |

The blind decoding in a CA situation is described with reference to Table 1. All UEs decoding PDCCH in the Primary Cell (PCell) attempt blind decoding to 6 candidates in the common search space with the assumption of DCI format sizes matching the first size and second size, regardless of the DL transmission mode. That is, the blind decoding is attempted 12 times. In Table 1, the UE decoding PDCCH in the PCell and Secondary Cell (SCell) assumes that the DCI format having a size that matches the second size depends on the DL transmission mode.

With respect to DL transmission mode 1, 2, or 7, the blind decoding is attempted with the assumption that the DCI format having a size that matches the second size is DCI format 1. In the case of DL transmission mode 3, the blind decoding is attempted with the assumption that the DCI formation having a size that matches the second length is DCI formation 2A. In the case of DL transmission mode 4, the blind decoding is attempted with the assumption that the DCI formation having a size that matches the second length is DCI formation 2. In the case of DL transmission mode 5, the blind decoding is attempted with the assumption that the DCI formation having a size that matches the second length is DCI formation 1D. In the case of DL transmission mode 6, the blind decoding is attempted with the assumption that the DCI formation having a size that matches the second length is DCI formation 1B.

Since the total number of candidates for blind decoding in the UE-specific search space is 16 and, since when the DCI format size matches the first size according to the DL transmission mode as described above, the blind decoding is attempted with the assumption of the second size, the blind decoding is attempted up to 32 times. When the blind decoding to the DCI format 4 of the serving cell supports UL SU-MIMO, the UE has to attempt 16 additional blind decodings. Assuming the number of SCells is X and the number of serving cells supporting UL SU-MIMO is Y, the UE capable of CA has to attempt blind decoding (44+32*X+16*Y) times in the blind decoding procedure of the common search space and UE-specific search space.

In LTE Rel-10, the PDCCH transmission resource is allocated in units of Control Channel Elements (CCEs), and 1 CCE consists of 36 Resource Elements (REs). For PDCCH transmission, 4 or 8 CCEs can be allocated in the common search space and 1, 2, 4 or 8 CCEs can be used in the UE-specific search space. As the allocated transmission resource increases, the code rate of PDCCH decreases so as to transmit data to the UE with higher reliability. However, the Rel-10 system, which adopts the cross carrier scheduling and CA, has a drawback in that a large PDCCH transmission resource requirement in a specific cell, or a large number of UEs requiring PDCCH transmission within the cell, causes a shortage of PDCCH transmission resources.

SUMMARY OF THE INVENTION

The present invention has been made to address at least the above problems and/or disadvantages and to provide at least the advantages described below. Accordingly, an aspect of the present invention provides a method and apparatus for transmitting control signals by utilizing the transmission resource efficiently.

In accordance with an aspect of the present invention, a method for transmitting control information from a base station is provided. Indices of Resource Block (RB) sets are transmitted through higher layer signaling. DCI generated in a short DCI format is transmitted. The DCI includes a first index indicating an RB set having at least one allocated RB and a second index indicating the at least one allocated RB.

In accordance with another aspect of the present invention, a base station for transmitting control information is provided. The base station includes a transmitter that transmits indices of RB sets through higher layer signaling. The base station also includes a PDCCH generator that generates DCI in a short DCI format. The DCI includes a first index indicating an RB set having at least one allocated RB and a second index indicating the at least one allocated RB. The transmitter transmits the DCI.

In accordance with an additional aspect of the present invention, a method for receiving control information at a terminal is provided. It is determined whether short DCI format is configured to be used. When the short DCI format is configured to be used, a first index indicating an RB set having at least one allocated RB and a second index indicating the at least one allocated RB are received. The terminal communicates through the at least one allocated RB identified by the first and second indices.

In accordance with a further aspect of the present invention, a terminal for receiving control information is provided. The terminal includes a receiver that receives a first index indicating an RB set having at least one allocated RB and a second index indicating the at least one allocated RB, when a short DCI format is configured to be used. The terminal also includes a transmitter that performs transmission using the at least one allocated RB identified by the first and second indices.

BRIEF DESCRIPTION OF THE DRAWINGS

The above and other aspects, features and advantages of the present invention will be more apparent from the following detailed description when taken in connection with the accompanying drawings, in which:

FIGS. 1A to 1D are diagrams illustrating a principle of RB allocation through higher layer signaling, according to an embodiment of the present invention;

FIG. 2 is a table for use in Modulation and Coding Scheme (MCS) allocation through higher layer signaling, according to an embodiment of the present invention;

DETAILED DESCRIPTION OF EMBODIMENTS OF THE PRESENT INVENTION

Figure 1C:
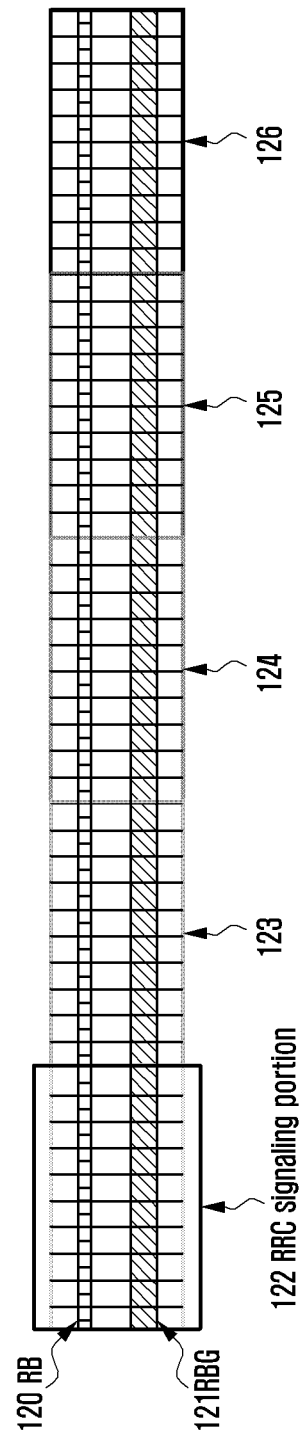

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Some of elements are exaggerated, omitted or simplified in the drawings, and the elements may have sizes and/or shapes different from those shown in drawings, in practice.

The control signal transmission method and apparatus, according to embodiments of the present invention, are described with reference to the accompanying drawings.

A description is first made of the short DCI format proposed in embodiments of the present invention, and the fields for the short DCI format that are configurable through higher layer signaling are then described.

The short DCI format is the DCI format that includes information of the DCI format designed for use in LTE Rel-10, with the exception of the fields configurable through higher layer signaling. Accordingly, this format is shorter than the normal DCI formats. This means that the PDCCH can be transmitted to the UE with a small number of CCEs as PDCCH transmission resources, without compromising the transmission coding rate.

From the view point of cell load, when a large number of UEs exists within the cell and a large amount of PDCCH transmission resources is required, the short DCI format can be configured through higher layer signaling. Particularly, the short DCI format can be configured in the service negotiation procedure between the UE and the eNB. Once the short DCI format has been configured through the higher layer signaling, the terminal uses the short DCI format rather than the normal format. Accordingly, the UE has to attempt blind decoding with the assumption of the short DCI format size rather than the normal DCI format size. Consequently, the first to third sizes for decoding the short DCI formats are shorter than the first to third sizes for decoding the normal DCI formats.

The fields of a normal DCI format configurable through higher layer signaling for determining the short DCI format are described below.

FIGS. 1A to 1D are diagrams illustrating a principle of RB allocation through higher layer signaling, according to an embodiment of the present invention. Prior to describing the higher layer singling-based RB allocation provided by embodiments of the present invention, the RB allocation method specified in LTE Rel-10 is briefly described. The LTE Rel-10 specifies three types of RB allocations. The types 0 and 1 RB allocations are of non-consecutive RB allocations while the type 2 RB allocation is of consecutive RB allocation. Although FIG. 1 is directed to an embodiment of type 0 RB allocation, the type 1 and type 2 RB allocations can be performed in the same way. In type 0 RB allocation, the eNB divides the RBs into groups for non-consecutive allocation. This group is referred to as Resource Block Group (RBG). Table 2 shows a relationship between the number of RBs depending on the bandwidth and the RBG size.

TABLE 2

| Number of RB based on bandwidth | RBG size |
| --- | --- |
| Less than 10 | 1 |
| 11~26 | 2 |
| 27~63 | 3 |
| 64~110 | 4 |

FIG. 1 is directed to RB allocation on the 20 MHz bandwidth. The bandwidth of 20 MHz corresponds to RBs 100. Since the number of RBs is 10 in FIG. 1, the RBG size is 4 and thus the total bandwidth is composed of 25 RBGs 101.

In an embodiment of higher layer signaling-based RB allocation, the eNB divides the RBs into several parts 102, 103, 104, 105 and 106, and configures the information indicating the part where RBs are allocated through higher layer signaling. The eNB notifies of the information on the RBs allocated in the selected part with the DCI of a short DCI format. For example, the eNB is capable of configuring the portion 102 for RB allocation through higher layer signaling and notifying of the information on the RBs allocated in the configured portion 102 through the DCI of a short DCI format. When notifying of the RB allocation with the DCI of the short DCI format, it is possible to use the RB allocation types 0, 1, and 2 of the LTE Rel-10. According to a modified example of the embodiment of the present invention, it is possible to configure only the indices of portions 102 to 106 of the RBs through higher layer signaling, and notify of the portion to be used with the DCI of the short DCI format. At least one bit for notifying of the index of the portion can be included in the RB allocation region according to the short DCI format. In a modified example of this embodiment of the present invention, since the RBs are divided into 5 portions 102 to 106, three bits for notifying of the index of one of the portions 102 to 106 are included at the beginning of the RB allocation region of the short DCI format.

In another embodiment of RB allocation illustrated in FIG. 1B, the eNB is capable of aggregating the dispersed portions into an aggregated portion, and configuring the information on the aggregated portion through higher layer signaling. The eNB notifies of the information indicating the RBs allocated in the configured portion with DCI of the short DCI format. That is, the eNB is capable of configuring a portion 110 for RB allocation through higher layer signaling, and notifying of the information on the RBs allocated in the portion 110 with DCI of the short DCI format. When notifying of the RB allocation information with DCI of the short DCI format, it is possible to use the RB allocation types 0, 1, and 2 of the LTE Rel-10 without modification, with the assumption that the aggregated portion 110 consists of consecutive RBs. According to a modified example of this embodiment of the present invention, it is possible to configure the indices of the dispersed portions constituting the aggregated portion 110, and notify of the portion to be used with DCI of the short DCI formation. At least one bit, for notifying of the index of the portion to be used, can be included at the beginning of the RB allocation region of the short DCI format. Since the number of portions 110 aggregated is 5, three bits, for notifying of the index, can be included at the beginning of the RB allocation region of the short DCI format.

In an additional embodiment of RB allocation illustrated in FIG. 1C, the eNB is capable of dividing all RBs 120 into several portions 122, 123, 124, 125 and 126, and configuring the information indicating the portion in which RBs are allocated through higher layer signaling. The eNB notifies of the information indicating the RBs allocated in the configured portions with DCI of the short DCI format. Unlike the embodiment associated with FIG. 1A, the RBG size is adjusted to fit for the number of RBs included in each portion to be configured through higher layer signaling. The eNB is capable of configuring the portion 122 for RB allocation through higher layer signaling, and notifying of the information on the RBs allocated in the portion 122 with DCI of the short DCI format. A size of an RBG 121 is adjusted from 4 to 2 according to the number of RBs in the configured portion 122. When notifying of the allocated RBs with DCI of the short DCI format, it is possible to use the RB allocation types 0, 1, and 2 of the LTE Rel-10. According to a modified example of this embodiment of the present invention, the eNB is capable of configuring only the indices of the portions 122 to 126 and notifying of the portion to be actually used with DCI of the short DCI format. At least one bit, for notifying of the index of the portion to be used, can be included at the beginning of the RB allocation region of the short DCI format. Since the RBs are divided into 5 portions, 122 to 126, in this embodiment of the present invention, three bits for notifying of the index can be included at the beginning of the RB allocation region of the short DCI format.

Figure 1D:
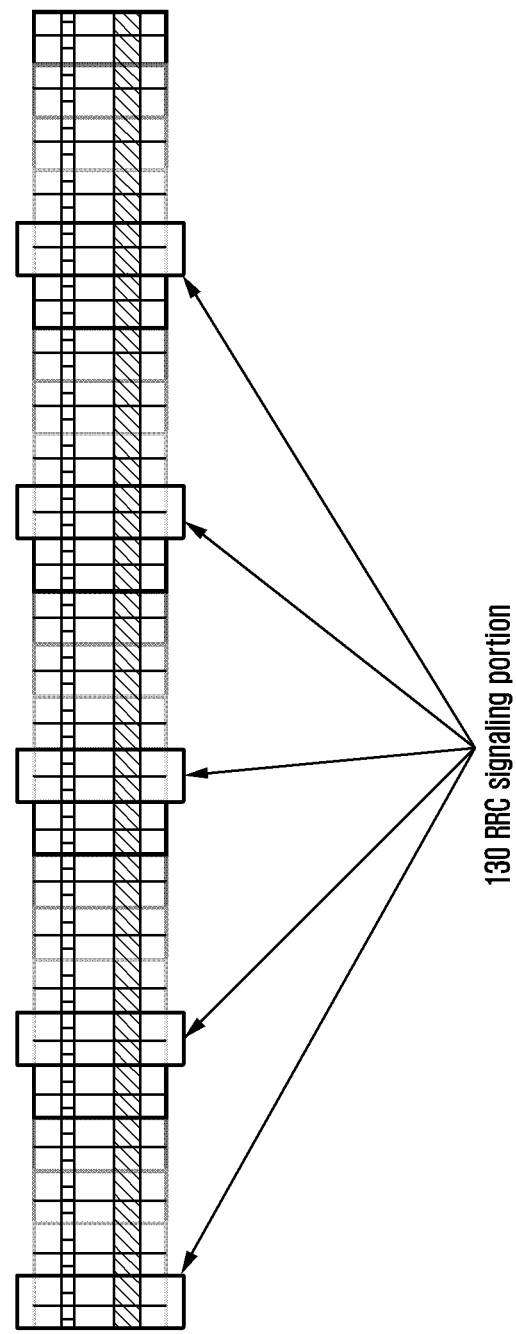

In a further embodiment of RB allocation illustrated in FIG. 1D, the eNB is capable of aggregating the dispersed portions into an aggregated portion, configuring the information on the portion to be used through higher layer signaling, and notifying of the information on the RBs allocated in the configured portions with DCI of the short DCI format. Unlike the embodiment described with respect to FIG. 1B, the RBG is adjusted in size according to the number of RBs of the aggregated portion through higher layer signaling. That is, the eNB is capable of configuring an aggregated portion 130 for RB allocation through higher layer signaling and notifying of the information on the RBs allocated in the portion 130 with DCI of the short DCI format. The RBG size is adjusted from 4 to 2 to fit for the number of RBs of the portion 130. When notifying of the RB allocation with DCI of the short DCI format, it is possible to use the RB allocation types 0, 1, and 2 of the LTE Rel-10 without modification with the assumption that the portion 130 consists of consecutive RBs. According to a modified example of this embodiment of the present invention, it is possible to configure the indices of the dispersed portions constituting the aggregated portion 130 and notify of the portion to be used with DCI of the short DCI formation. At this time, at least one bit for notifying of the index of the portion to be used can be included at the beginning of the RB allocation region of the short DCI format. Since the number of portions 130 aggregated is 5 in the modified example, three bits for notifying of the index can be included at the beginning of the RB allocation region of the short DCI format.

FIG. 2 is a table for use in MCS allocation through higher layer signaling, according to an embodiment of the present invention. In FIG. 2, $I_{MCS}$ 201 denotes an MCS index, and $Q_m$ 202 denotes a modulation scheme. The $Q_m$ is set to 2 for Quadrature Phase Shift Keying (QPSK), 4 for 16QAM, and 6 for 64QAM. $I_{TBS}$ 203 denotes an index for determining Transport Block Size (TBS).

According to an embodiment of MCS allocation, the eNB configures a reference $I_{MCS}$ 211 through higher layer signaling and notifies of the MCS indices of 4 levels including the reference $I_{MCS}$ 211. Although the legacy normal DCI format uses the MCS index of 5 bits, the number of bits can be reduced in accordance with this embodiment of the present invention. This method is advantageous in stable channel conditions.

According to another embodiment of MCS allocation, the eNB configures the modulation scheme through higher layer signaling and notifies of the MCS index indicating the MCS level to be used with DCI of the short DCI format. The eNB sets the modulation scheme to QPSK through higher layer scheduling. The QPSK modulation scheme corresponds to part 212. The eNB notifies of one of 0 to 9 as the index as $I_{MCS}$ corresponding to the QPSK modulation scheme with DCI of the short DCI format. 4 bits for differentiating among 10 indices are included in the short DCI format.

The eNB is capable of configuring at least one of Hybrid Automatic Repeat Request (HARQ) process number and rank through higher layer signaling to use DCI of the short DCI format. It is possible to set the HARQ process number to be used by the UE to 0 or 4, and to include a 1-bit field for HARQ process in the short DCI format. If the HARQ process field is set to 0, the UE uses only the HARQ process 0; and if the HARQ process is set to 1, the UE uses only the HARQ process 4.

When configuring the rank through higher layer signaling, the eNB is capable of setting the rank to 2 through higher layer signaling, and notifying the UE of the rank 2 with the field for a precoding matrix, which corresponds to the rank 2 in the DCI of the short DCI format.

Figure 3A:
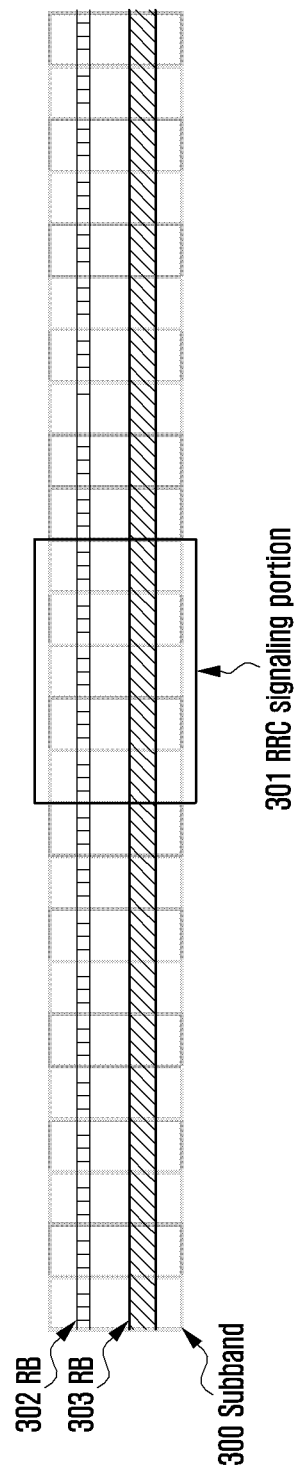
FIGS. 3A to 3C are diagrams illustrating a principle of channel information feedback in using RB allocation with a short DCI format, according to an embodiment of the present invention.
Figure 3B:
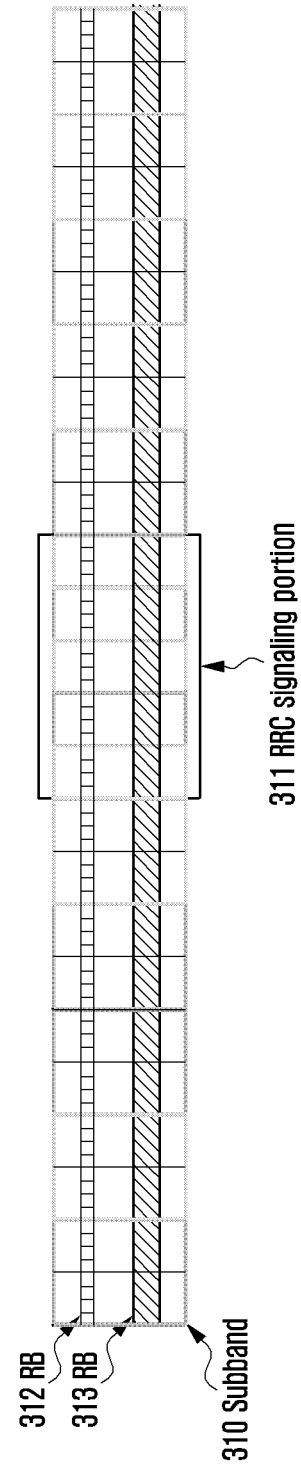
Figure 3C:
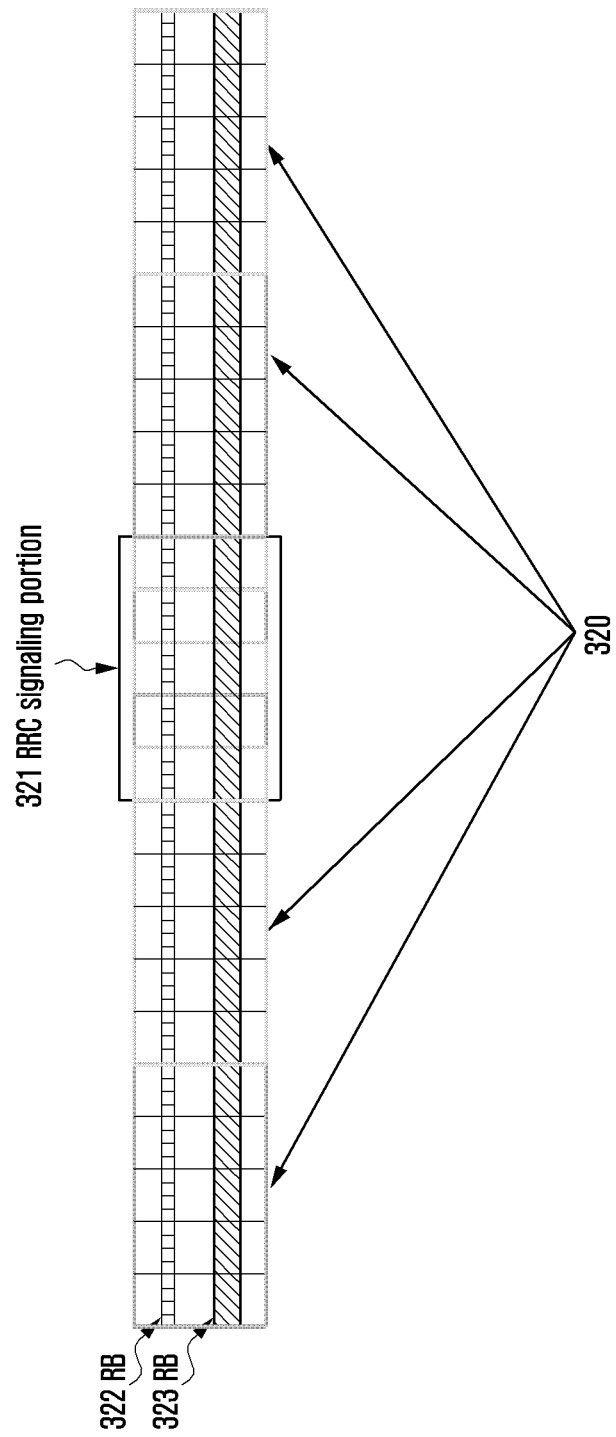

FIGS. 3A to 3C are diagrams illustrating a principle of channel information feedback in using RB allocation with a short DCI format, according to an embodiment of the present invention.

According to an embodiment for channel information feedback illustrated with respect to FIG. 3A, if the RB allocation portion configured through the higher layer signaling is portion 301, the terminal performs channel information feedback about the entire RBs. As described above, the eNB is capable of configuring the portion 301 for RB allocation through higher layer signaling and allocating at least one RB in the portion 301 with DCI of the short DCI format. However, the terminal is still capable of performing feedback about the channel information across an entire band. If portions other than the portion 301 have good channel condition, the eNB is capable of configuring to allocate the resource of portions having good channel quality to the terminal through higher layer signaling.

In both the non-period and periodic channel information feedback modes, the method specified in the LTE Rel-10 can be applied.

According to additional embodiments for channel information feedback illustrated with respect to FIGS. 3B and 3C, a portion 311 or 321 is configured by the eNB for RB allocation through higher layer signaling, the UE performs channel information feedback about all RBs, however configures a sub-band size different from that of the portion 311 or 321. That is, the eNB configures a sub-band size that is a little larger than that of the portion 311 or 321 allocated through higher layer signaling. The sub-band size is set to 4 RBs for the portion 311 or 321, but 8 RBs (FIG. 3A) or 20 RBs (FIG. 3B) for the remaining portions that are not configured through the higher layer signaling. The UE is still performing channel information feedback across the entire band. By differentiating the sub-band sizes, the terminal is capable of performing channel information feedback densely for the portion available for current scheduling and less densely for the remaining portions, resulting in the saving of resources. The feedback of the channel information, with the exception of the sub-band size, can be configured in both the non-periodic and periodic channel information feedback modes, according to the method defined in the LTE Rel-10. The eNB is also capable of configuring the sub-bands other than the portion 311 or 321, with the higher layer signaling, such that the wideband Channel Quality Indication (CQI), or differential CQI in association with potion 311 or 321, is transmitted. The transmission of the channel information, such as channel information feedback period and offset, can be configured according to the method specified in the LTE Rel-10 in both the non-periodic and periodic channel information transmission modes.

Tables 3 and 4 show the numbers of bits reduced with the short DCI formats as compared to the normal DCI formats. Tables 3 and 4 are based on an entire bandwidth of 20 MHz and 100 RBs and configuration of a portion including 20 RBs through higher layer signaling. In Table 3 the RB allocation is performed according to an embodiment illustrated in FIG. 1A or 1B. A first embodiment described with respect to FIG. 2 is used for MCS configuration. Furthermore, it is assumed that 1 bit of the short DCI format is used for HARQ process.

TABLE 3

|  | normal DCI format 1 | short DCI format 1 | normal DCI format 2 | short DCI format 2 | normal DCI format 1A | short DCI format 1A |
|---|---|---|---|---|---|---|
| 0/1A indication flag/VRBs |  |  |  |  | 2 | 2 |
| RA header | 1 | 1 | 1 | 1 |  |  |
| RB allocation | 25 | 5 | 25 | 5 | 13 | 8 |
| MCS | 5 | 2 | 10 | 4 | 5 | 2 |
| HARQ process | 3 | 1 | 3 | 1 | 3 | 1 |
| NDI | 1 | 1 | 2 | 2 | 1 | 1 |
| RV | 2 | 2 | 4 | 4 | 2 | 2 |
| TPC command | 2 | 2 | 2 | 2 | 2 | 2 |
| TB swap flag |  |  | 1 | 1 |  |  |
| Precoding Info. |  |  | 6 | 6 |  |  |
| CRC | 16 | 16 | 16 | 16 | 16 | 16 |
| Total | 54 | 30 | 70 | 42 | 44 | 34 |

Referring to Table 3, the number of bits of DCI format 1 is reduced up to 44% when the short DCI format is used instead of the normal DCI format. The number of bits of DCI format 2 is reduced up to 40% in using the short DCI format instead of the normal DCI format. Also, the number of bits of DCI format 1A is reduced up to 23% in using the short DCI format instead of the normal DCI format.

In Table 4 the RB allocation is performed according to an embodiment illustrated with respect to FIG. 1C or 1D. The MCS configuration is performed according to a first embodiment described with respect to FIG. 2. It is assumed that 1 bit of the short DCI format is used for HARQ process.

TABLE 4

|  | normal DCI format 1 | short DCI format 1 | normal DCI format 2 | short DCI format 2 | normal DCI format 1A | short DCI format 1A |
|---|---|---|---|---|---|---|
| 0/1A indication flag/VRBs |  |  |  |  | 2 | 2 |
| RA header | 1 | 1 | 1 | 1 |  |  |
| RB allocation | 25 | 10 | 25 | 10 | 13 | 8 |
| MCS | 5 | 2 | 10 | 4 | 5 | 2 |
| HARQ process | 3 | 1 | 3 | 1 | 3 | 1 |
| NDI | 1 | 1 | 2 | 2 | 1 | 1 |
| RV | 2 | 2 | 4 | 4 | 2 | 2 |
| TPC command | 2 | 2 | 2 | 2 | 2 | 2 |
| TB swap flag |  |  | 1 | 1 |  |  |
| Precoding Info. |  |  | 6 | 6 |  |  |
| CRC | 16 | 16 | 16 | 16 | 16 | 16 |
| total | 54 | 35 | 70 | 47 | 44 | 34 |

Referring to Table 4, the number of bits of DCI format 1 is reduced up to 35% in using the short DCI format instead of the normal DCI format. The number of bits of DCI format 2 is reduced up to 33% in using the short DCI format instead of the normal DCI format. Also, the number of bits of DCI format 1A is reduced up to 23% in using of the short DCI format instead of the normal DCI format.

Figure 4A:
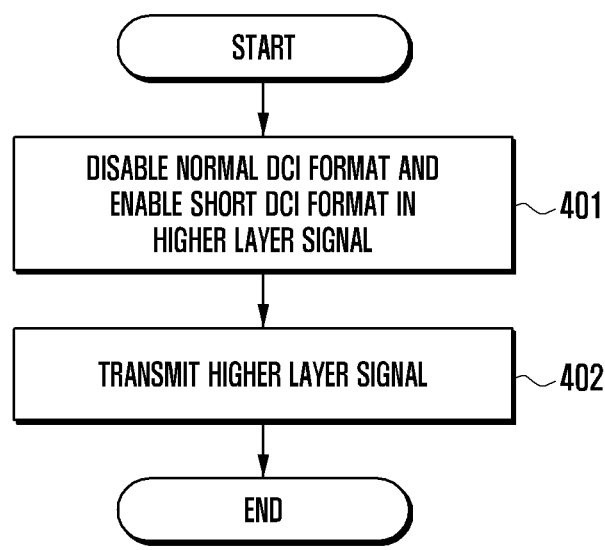
FIG. 4A is a flowchart illustrating a short DCI format enabling procedure of the eNB, according to an embodiment of the present invention.

FIG. 4A is a flowchart illustrating a short DCI format enabling procedure of the eNB, according to an embodiment of the present invention.

The eNB disables the normal DCI format and enables the short DCI format through higher layer signaling, in step 410. That is, the eNB configures a higher layer signal for the UE to use the short DCI formats. The eNB sends the configured higher layer signal to the UE, in step 402.

In FIG. 4A, the eNB enables the short DCI format. However, the UE is also capable of disabling the short DCI format and enabling the normal DCI format, if necessary. This is described in greater detail below with reference to FIG. 5A. According to a modified embodiment, it is possible to configure a field to indicate whether to use the short DCI format or normal DCI format.

Figure 4B:
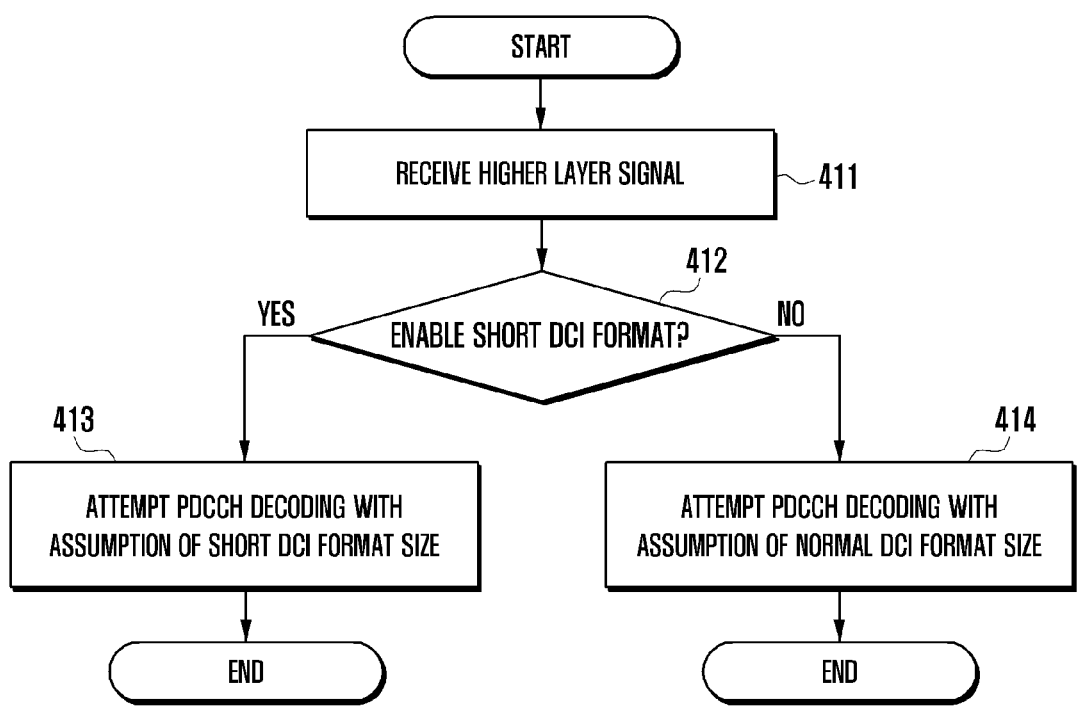
FIG. 4B is a flowchart illustrating a short DCI format enabling signal reception and blind decoding procedure of the UE, according to an embodiment of the present invention.

FIG. 4B is a flowchart illustrating a short DCI format enabling signal reception and blind decoding procedure of the UE, according to an embodiment of the present invention.

The UE receives a higher layer signal, in step 411. The UE analyzes the received higher layer signal to determine whether the short DCI format is enabled, in step 412. That is, the UE determines whether it is configured to use the short DCI format. If it is determined that the short DCI format is enabled, the UE attempts PDCCH decoding with the assumption of the short DCI format size, in step 413. If it is determined that the short DCI format is not enabled, the UE attempts PDCCH decoding with the assumption of the normal DCI format size, in step 414.

According to a modified example of the embodiment of FIG. 4B, it is also possible to configure a field to indicate whether to use the short DCI format or normal DCI format.

Figure 5A:
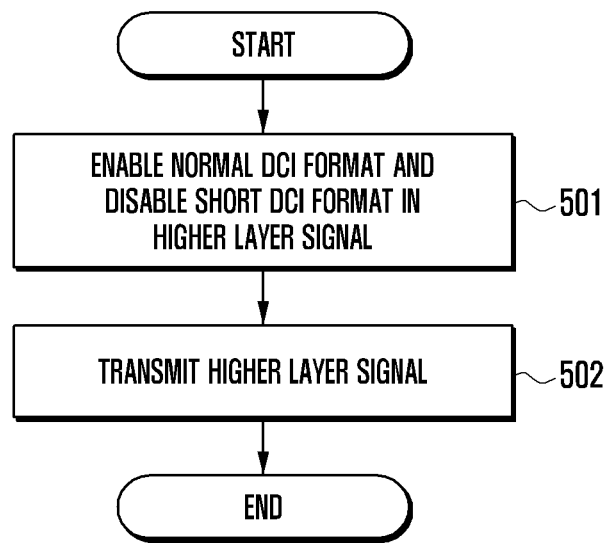
FIG. 5A is a flowchart illustrating a short DCI format disabling procedure of the eNB, according to an embodiment of the present invention.

FIG. 5A is a flowchart illustrating a short DCI format disabling procedure of the eNB, according to an embodiment of the present invention.

The eNB enables the normal DCI format and disables the short DCI format through higher layer signaling, in step 501. That is, the eNB configures a higher layer signal for the UE to use the normal DCI formats. The eNB sends the configured higher layer signal to the UE, in step 502.

Figure 5B:
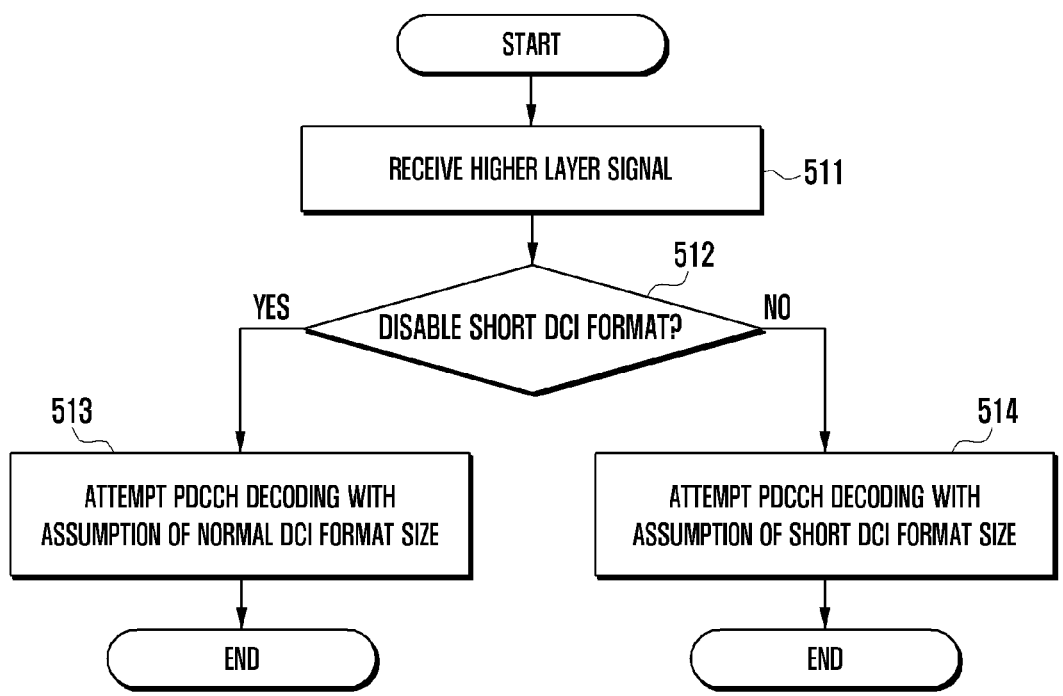
FIG. 5B is a flowchart illustrating a short DCI format disabling signal reception and blind decoding procedure of the UE, according to an embodiment of the present invention.

FIG. 5B is a flowchart illustrating a short DCI format disabling signal reception and blind decoding procedure of the UE, according to an embodiment of the present invention.

The UE receives a higher layer signal, in step 511. The UE analyzes the higher layer signal to determine whether the short DCI format is disabled, in step 512. If it is determined that the short DCI format is disabled, the UE attempts PDCCH decoding with the assumption of normal DCI format size, in step 513. If it is determined that the short DC format is not disabled, the UE attempts PDCCH decoding with the assumption of short DCI format size, in step 514.

Figure 6:
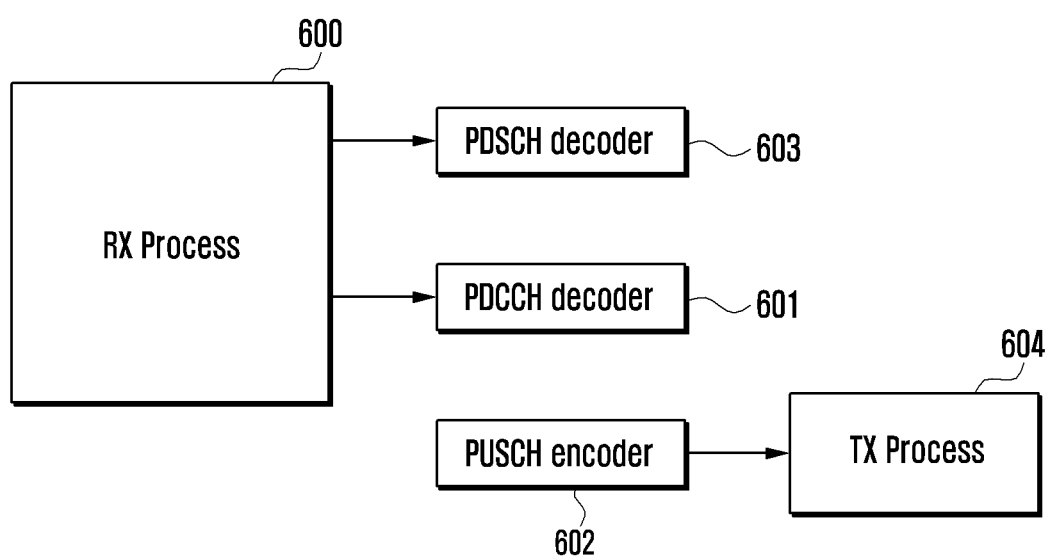
FIG. 6 is a block diagram illustrating a configuration of the UE, according to an embodiment of the present invention.

FIG. 6 is a block diagram illustrating a configuration of the UE, according to an embodiment of the present invention.

A receiver 600 receives a signal and delivers the PDCCH and PDSCH to a PDCCH decoder 601 and a PDSCH decoder 603, respectively. The PDCCH decoder 601 decodes, from the signal, the DCI in the short DCI format, according to one of the embodiments of the present invention. The PDSCH decoder 603 decodes the downlink data according to the information indicated by the DCI in short DCI format. A PUSCH encoder 602 generates uplink information to a transmitter 604. The transmitter 604 transmits the uplink information to the eNB. As described above, the UE is capable of using the normal DCI format instead of the short DCI formation according to the received higher layer signal.

Figure 7:
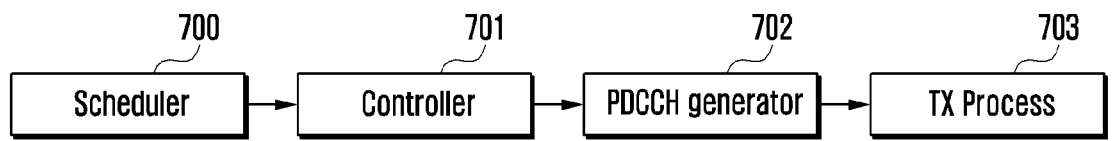
FIG. 7 is a block diagram illustrating a configuration of the eNB, according to an embodiment of the present invention.

FIG. 7 is a block diagram illustrating a configuration of the eNB, according to an embodiment of the present invention.

A scheduler 700 and a controller 701 control a PDCCH generator 702 to generate a DCI in the short DCI format according to one of the embodiments of the present invention, and delivers the DCI to a transmitter 703. The transmitter 703 transmits the received DCI to the UE. The eNB is capable of using the normal DCI format instead of the short DCI format, according to a network condition or a request from the UE.

As described above, the control signal transmission method and apparatus of embodiments of the present invention are capable of improving transmission resource utilization efficiency.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module", according to embodiments of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although embodiments of the present invention have been described in detail hereinabove with specific terminology, this is for the purpose of describing particular embodiments only and not intended to be limiting of the invention. While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for transmitting control information from a base station, the method comprising:
    transmitting a first index indicating a resource block (RB) set including at least one RB allocated to the terminal for transmitting a data on higher layer signaling to a terminal; and
    transmitting downlink control information (DCI) generated according to a DCI format of a second DCI format set selected among a first DCI format set and the second DCI format set on physical downlink control channel (PDCCH), wherein the DCI includes a second index indicating at least one RB allocated to the terminal in the RB set indicated by the first index,
    wherein a number of bits of the second index included in the DCI generated according to the DCI format of the second DCI format set is less than a number of bits of the second index included in the DCI generated according to the DCI format of the first DCI format set.

2. The method of claim 1, further comprising adjusting an RB group (RBG) in size according to each of RB sets.

3. The method of claim 1, wherein each of the RB sets comprises consecutive RBs.

4. The method of claim 1, wherein each of the RB sets comprises non-consecutive RBs.

5. A base station for transmitting control information, comprising:
    a transmitter for transmitting a first index indicating resource block (RB) set including at least one RB allocated to the terminal for transmitting a data on higher layer signaling to a terminal; and
    a physical downlink control channel (PDCCH) generator configured to generate downlink control information (DCI) according to a DCI format of a second DCI format set selected among a first DCI format set and the second DCI format set on PDCCH, wherein the DCI includes a second index indicating at least one RB allocated to the terminal in the RB set indicated by the first index,
    wherein a number of bits of the second index included in the DCI generated according to the DCI format of the second DCI format set is less than a number of bits of the second index included in the DCI generated according to the DCI format of the first DCI format set.

6. The base station of claim 5, wherein each of RB sets is referenced to adjust an RB group (RBG) in size.

7. The base station of claim 5, wherein each of the RB sets comprises consecutive RBs.

8. The base station of claim 5, wherein each of the RB sets comprises non-consecutive RBs.

9. A method for receiving control information by a terminal, the method comprising:
    receiving a first index indicating a resource block (RB) set including at least one RB allocated to the terminal for transmitting a data on higher layer signaling; and
    receiving downlink control information (DCI) generated according to a DCI format of a second DCI format set selected among a first DCI format set and the second DCI format set on physical downlink control channel (PDCCH), wherein the DCI includes a second index indicating at least one RB allocated to the terminal in the RB set indicated by the first index,
    wherein a number of bits of the second index included in the DCI generated according to the DCI format of the second DCI format set is less than a number of bits of the second index included in the DCI generated according to the DCI format of the first DCI format set.

10. The method of claim 9, further comprising feeding back channel information with a configuration of sub-bands of other RB sets that are larger in size than a sub-band of the RB set indicated by the first index.

11. A terminal for receiving control information, comprising:
    a transceiver for transmitting and receiving a signal;
    a controller configured to receive a first index indicating a resource block (RB) set including at least one RB allocated to the terminal for transmitting a data on higher layer signaling, and receive downlink control information (DCI) generated according to a DCI format of a second DCI format set selected among a first DCI format set and the second DCI format set on physical downlink control channel (PDCCH), wherein the DCI includes a second index indicating at least one RB allocated to the terminal in the RB set indicated by the first index, wherein a number of bits of the second index included in the DCI generated according to the DCI format of the second DCI format set is less than a number of bits of the second index included in the DCI generated according to the DCI format of the first DCI format set.

12. The terminal of claim 11, wherein the controller is configured to feedback channel information with a configuration of sub-bands of other RB sets that are larger in size than a sub-band of the RB set indicated by the first index.

* * * * *